United States Patent [19]

Vandersteel

[11] Patent Number: 4,458,602
[45] Date of Patent: Jul. 10, 1984

[54] PNEUMATIC PIPELINE TRANSPORT SYSTEM

[76] Inventor: William Vandersteel, c/o Ampower Corporation, 1 Marine Plz., North Bergen, N.J. 07047

[21] Appl. No.: 273,050

[22] Filed: Jun. 12, 1981

[51] Int. Cl.³ ............................................. B61B 13/10
[52] U.S. Cl. .................................. 104/138 R; 104/168
[58] Field of Search ............... 104/138 R, 138 G, 154, 104/155, 165, 168

[56] References Cited

U.S. PATENT DOCUMENTS

| 959,642 | 5/1910 | Stoetzel | 104/155 |
|---|---|---|---|
| 3,605,629 | 9/1971 | Edwards | 104/138 R |
| 3,796,164 | 3/1974 | Nogi et al. | 104/138 R |
| 3,797,405 | 3/1974 | Carstens et al. | 104/138 R |
| 3,861,319 | 8/1972 | Gelhard et al. | 104/138 R |
| 3,881,425 | 5/1975 | Carstens | 104/138 R |
| 3,996,858 | 12/1977 | Sangl | 104/138 R |
| 3,999,487 | 4/1975 | Valverde | 104/138 R |
| 4,174,921 | 11/1979 | Teodorescu et al. | 104/138 R |

Primary Examiner—Randolph Reese
Assistant Examiner—Gregory A. Beehner
Attorney, Agent, or Firm—Hopgood, Calimafde, Kalil, Blaustein & Judlowe

[57] ABSTRACT

A pneumatic pipeline transportation system for solid, containerized cargo. Cargo carrying vehicles are propelled within a hollow guideway adapted to hold movable vehicles of substantially similar cross-section. Kinetic energy is applied to the vehicle intermittently, causing the vehicle to set a trapped column of air in the guideway in motion. The air column acts on adjacent vehicles, and in combination with the applied force, propels the vehicles through the guideway.

3 Claims, 2 Drawing Figures

PNEUMATIC PIPELINE TRANSPORT SYSTEM

BACKGROUND OF THE INVENTION

1. Field of the Invention

This invention relates to a pneumatic pipeline transport system for moving solid, containerized cargo. More particularly, this invention relates to a system wherein the containers themselves act as pumps to energize the system in response to an intermittently applied force on the container which sets up a moving column of air which further propels the containers.

2. Prior Art

Pipeline transport systems have been used successfully for many years for conveying fluids, such as water or petroleum, from the source of origin to areas of utilization. Pipeline transport systems have also found widespread use in conveying particulate matter or slurries, such as grain or pulverized coal. Liquids and slurries are generally propelled by a series of high-power pumps.

More recently, there have been a number of proposed pipeline transport systems for carrying solid, containerized cargo or passenger vehicles through tubular conduits. Typically, the containers or vehicles in these systems have been pneumatically or hydraulically propelled. Pneumatic propulsion of large vehicles requires complex and expensive means for generating high pressure air flow in the conduit. Maintaining the high pressure flow creates particular problems for loading and unloading vehicles into the ambient atmosphere. Hydraulic systems which have been proposed also require closed containers and powerful pumps. Moreover, such hydraulic systems present maintenance and water disposal problems.

One approach has been to propel the vehicles by the fluid momentum of low pressure air circulated at a mean velocity by external pumps. U.S. Pat. No. 3,797,405 which issued to Carstens et al on Mar. 19, 1974, describes a system wherein the driving momentum for the vehicles is generated by the rapid flow of air in the conduit. The vehicles are configured to have a high drag coefficient so that they may be accelerated to a velocity approximating the mean velocity of the driving air. Booster pumps are employed to maintain a large mass flow rate of air at a low static pressure to avoid pressure differentials in the system. Such booster pumps, however, are costly to fabricate and maintain, and are inefficient in terms of energy utilization. Moreover, such air circulating systems require special techniques for loading and unloading vehicles in the ambient atmosphere.

Other systems which are known in the art use various means of continuous propulsion for moving the vehicle along the interior of the pipeline. For example, in some known systems the vehicles are self-propelled by internal motors, or electromagnetically propelled by linear solenoid motors wherein electrical current flowing through propulsion coils produces a magnetic flow field that propels a ferro-magnetic vehicle. Such continuously propelled systems are described in U.S. Pat. No. 3,861,319, which issued to Gelhard et al on Aug. 14, 1972, and in U.S. Pat. No. 3,996,858, which issued to D. W. Sange on Dec. 14, 1977. Such systems are costly and unreliable. The inclusion of a motor in each vehicle increases both its initial cost, and the probability of mechanical breakdown. And, electromagnetically propelled systems are impractical.

It is an object of this invention to provide a transportation system which simply and economically transports said cargo between predetermined locations.

It is a further object of this invention to provide a transportation system which is simple in construction and relatively maintenance free.

It is yet a further object of this invention to provide a transportation system which is highly energy efficient; eliminating the energy inefficiencies of the prior art air pumps required to create high mass flow of an air column or the energy losses which result from continuously propelling vehicles through the system.

It is a still further object to precisely control the energy input to the system for reasons, among others, including the prevention of resonant oscillations in the system.

SUMMARY OF THE INVENTION

The foregoing and other objects are achieved by this invention which is provided with a drive arrangement for periodically imparting kinetic energy directly to the vehicles, the vehicles subsequently coupling a portion of the energy to an air column contained within a conduit guide. The vehicles within the conduit perform as pistons in a cylinder so as to pump the air column. After a predetermined amount of the kinetic energy is lost as heat as a result of decelerating forces, such as friction, more kinetic energy must be supplied to further accelerate the vehicles and the air column, and thereby keep the system in motion.

The accelerating force may be applied by any of a plurality of arrangements, such as friction drives, mechanical linkage drives, or electromagnetic drives. In a preferred embodiment, the vehicle travels in a closed loop of pipeline having a substantially coextensive cross-section therewith. A friction drive arrangement having a rotating friction wheel is provided to transmit energy to the vehicle. The forward acceleration of the vehicle compresses the air ahead of it within the pipeline to act as a positive accelerating force on a further vehicle which immediately precedes the accelerated vehicle in the pipeline. This effect is transmitted to all the other vehicles and trapped air pockets in the closed loop system.

This approach lends itself to variable speed and acceleration control so that conditions of dynamic instability are avoided. Furthermore, the mechanical efficiency of the drive mechanism is very high. The energy losses associated with pump efficiency in the prior art is avoided. Moreover, the frictional drive is particularly reliable and maintenance-free.

BRIEF DESCRIPTION OF THE DRAWING

These and other objects, features, and advantages of the invention will be better understood by reading the following detailed description in conjunction with the attached drawings, in which.

DETAILED DESCRIPTION OF THE DRAWING

Figure 1:
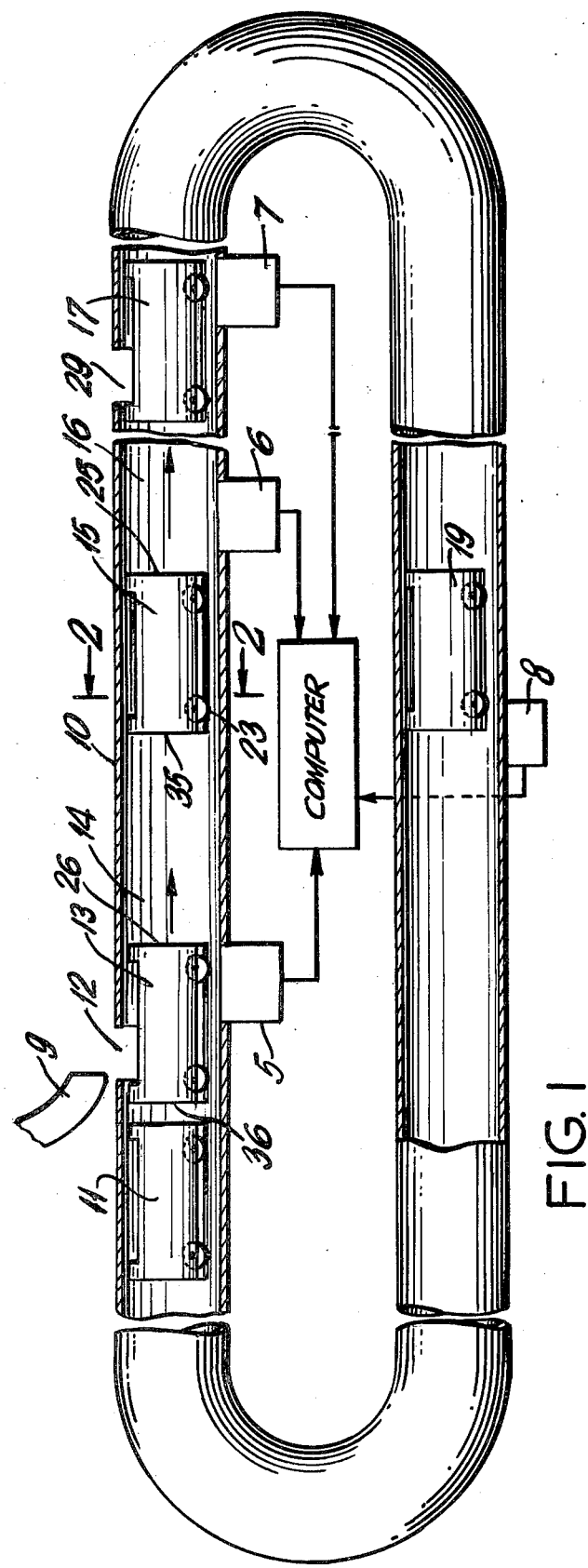
FIG. 1 is a graphic representation of a pneumatic embodiment of a pipeline transport system, constructed in accordance with the principles of the invention.

FIG. 1 is a graphic representation of a pneumatic pipeline transport system according to the invention. The system basically comprises a hollow tubular pipeline or guideway 10 through which vehicles 11, 13, 15, 17, 19 of substantially the same cross-sectional configuration are adapted to ride; loading and unloading stations 12, 29, respectively, in open communication with the atmosphere; and drive means 5, 6, 7, 8 for inputting energy into the system.

In this embodiment, the cross-sectional configuration of guideway 10 is shown as circular. Circular guideway is advantageous in that circular pipeline is commercially available. Pipe having diameters ranging from 16 to 84 inches can be easily purchased. Circular has an added advantage when used underground because of uniform distribution of the external pressure of the earth. However, the cross-sectional configuration of the guideway could be any other suitable shape such as square or rectangular.

Guideway 10 defines a predetermined path of travel between two geographic points. FIG. 1 shows an advantageous embodiment wherein a closed loop is utilized so that there is a continuous flow of two-way traffic. The pipeline transport may be constructed above ground, where it is capable of running over any terrain, or it may be buried underground. An above ground system would require a support structure which is expensive to construct and costly to maintain. A buried pipeline is advantageous in that it is hidden from view, free from interference by other traffic, provides a protective atmosphere for the traffic therein, prevents dust and other pollutants from escaping into the atmosphere, and it attenuates internal noise.

In a typical trip around a closed loop system running between two points, the vehicles are aligned butt-to-butt at loading zone 12 where the cargo is illustratively loaded onto vehicle 13 by chute 11. Drive mechanism 5, herein a friction drive utilizing a rotating tire as described more fully below, accelerates vehicle 13 as soon as it is loaded. This imparts kinetic energy to air pocket 14 which in turn imparts kinetic energy to vehicle 15, which in turn transfers energy to other air pockets and vehicles further downstream. Intermittent boosting by additional drive mechanisms, such as 6, as the vehicles proceed downstream, keeps the entire system moving at a relatively constant rate. An unloading station 29 is provided in guideway 10 at the point of utilization or storage of the cargo. Empty vehicles, such as 19, return to the loading zone 9 via the other side of the loop.

Figure 2:
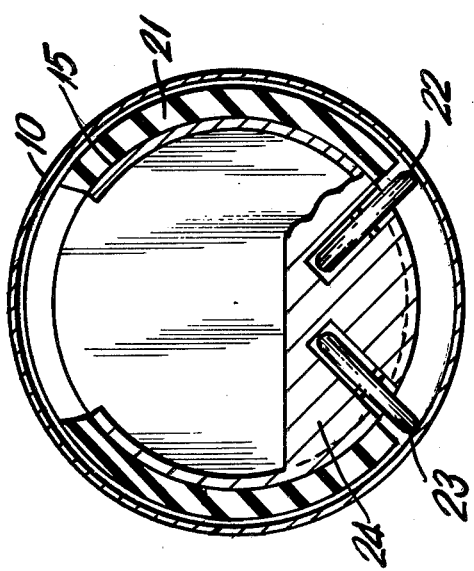
FIG. 2 is a cross-sectional representation of a vehicle within the interior of the pipeline, taken along section plane 2—2 in FIG. 1.

The vehicles are constructed so as to have a cross-sectional configuration which is substantially identical in size and shape to the cross-section of guideway 10. In an illustrative embodiment as shown in FIGS. 1 and 2, the vehicles are cylindrical with a top portion removed so that cargo can be readily loaded and unloaded. FIG. 2 shows a cross-section of vehicle 15 as taken along line 2—2 in FIG. 1. The vehicles are generally hollow except for wheel carrying assembly 25. The vehicles are designed to have maximum load-carrying capacity. A rubber or neoprene gasket 21 is attached to the outside of vehicle 15 (not shown in FIG. 1) to create a pneumatic seal as will be further described below. It should be noted that seal 21 fits around the entire circumference at one or both ends of the vehicles. Although the vehicles are open, there is very low spillage in the system since there is little speed differential between the flow of the air column and the speed of the vehicle. Any spillage is also swept along with the vehicles to the unloading station where provision may be made for its removal.

Vehicle 15 rides on self-stabilizing, load-bearing wheels 22, 23 in a wheel carrying assembly 24. Wheels 22, 23 are advantageously set at an angle, i.e., are toed-out with respect to the axis of the longitudinal pipe axes, to prevent spiraling of the vehicle within a circular pipeline at certain speeds. Use of a rectangular or square pipeline, or use of rails, guides or the like, would also obviate the spiraling problem. Other anti-friction means for supporting and facilitating forward motion of the vehicles, such as electromagnetic suspension bearings, or air film lubrication, may be used.

A major feature of the inventive system is the means for energizing the system. In the system according to the invention, the vehicles act as a "pump" to create a pressure differential between adjacent ones of the vehicles. Guideway 10 is naturally filled with air. The vehicle and air-filled pipeline is a two-phase flow system. Referring to FIG. 2, vehicle 15 has a cross-sectional area which is substantially equal to the cross-section of pipeline 10. Rubber gasket 21 fits around the circumference of the vehicle body and is in close proximity to guideway 10. Referring back to FIG. 1, the major motivating force in the inventive system is the kinetic energy of the air column trapped inside pipeline 10 and between vehicles 11, 13, 15, 17, and 19. However, unlike the prior art systems described above, the air column is not energized by external means such as pumps. In this invention, the vehicles themselves impart motion to the air. External drive means 5, 6, 7, 8 are employed to impart kinetic energy (or to absorb kinetic energy on deceleration) to the vehicles as needed for operation and control. As vehicle 13 is accelerated by booster 5, it sets the pocket of air 14 between it and vehicle 15 in motion. A pressure differential develops between front end 36 and rear end 26 of vehicle 13. Pressure is also applied to rear end 35 of vehicle 15, thereby transferring energy from air pocket 14 to propel vehicle 15. In turn, vehicle 15 acts on air pocket 16 and vehicle 17 which are located downstream from vehicle 15. Eventually, all vehicles in the system are mutually energized. Additional drive means 6, 7, 8, or boosters, are placed along guideway 10 as is necessary to maintain speed and control of the vehicles.

The pneumatic pipeline, as a two-phase flow of vehicles and air pockets, can be analyzed in terms of a lightly damped spring-mass system wherein the air pockets are springs and the vehicles or connected trains of vehicles are masses. The system has as many degrees of freedom as there are vehicles between adjacent booster locations. The system should be designed so that a two-phase flow is simulated in order to avoid unstable flow conditions in which resonant oscillations develop.

In a preferred embodiment, drive means 5, 6, 7, 8 comprise a rotating tire which protrudes through the bottom of guideway 10 so as to frictionally engage the bottom of the vehicles as they pass the location of the tire. The weight of the vehicles provides the frictional force. The tire can be driven by an electric motor or its equivalent, or any other means for creating rotational movement of the tire.

This mode for supplying energy is highly efficient, reliable, and inexpensive. More importantly, however, it may be precisely controlled by a digital electronic computer. The two-phase flow system of a pneumatic pipeline has a condition of dynamic instability wherein the whole system goes into resonant oscillation. In a preferred embodiment, a digital electronic computer is connected to means which continuously monitors the air pressure and/or vehicle velocity in the pipeline and controls the rate of rotation of the tire. Generally, the tire will accelerate the vehicles. However, the tire may also be used to decelerate the vehicles if necessary to prevent a condition of instability.

In addition to frictional drives, such as the tire or a conveyor belt, other means for periodically imparting kinetic energy to the vehicles may be used. Mechanical linkage drives, such as a rotating chain which engages a pawl on the bottom of the vehicle, are suitable. Another solution would be to have a section of the pipeline act as an armature of a linear electric motor and the vehicle act as the stator. Moreover, the use of gravitational force wherein the potential energy of the vehicle as it proceeds down a decline is converted into kinetic energy is extremely economical. In addition, combinations of the above-mentioned drive mechanisms may be employed, i.e., friction drive may be combined with gravitational as it would occur in the terrain over which the pipeline travels.

The location of additional drive mechanisms or boosters is determined by the energy requirements of the system. The energy requirements of the system depend on factors such as topography, weights of the vehicle and cargo, and desired through-put capacity. Drive mechanisms should be located frequently enough to provide the desired speed and control of the vehicles, but not too frequent as to be a waste of energy or to lead to an unstable condition. The location of boosters can be determined empirically for each individual system or application. In the alternative, the location can be determined by computer analysis of the system by techniques well-known in the art.

It is to be understood that the above-described example is merely illustrative of the many possible specific embodiments which can be devised to represent application of the principles of this invention. Numerous and varied arrangements can be devised with these principles by those skilled in the art without departing from the spirit and scope of the invention. In particular, although the pipeline shown here is circular in cross-section, it could be square, rectangular, or any other suitable configuration. The diameter of the pipeline is shown herein as being constant throughout the length of the guideway. However, it would be advantageous to restrict the diameter of the pipeline in the vicinity of the booster so as to create a better seal, and consequently, better pumping action. Also, the pipeline diameter is advantageously increased about curves or turns therein to facilitate travel of the vehicles. Neoprene seal 21 shown in FIGS. 1 and 2 reduces some of the back-flow in the air column, but the seal is not perfect. Other drive mechanisms for intermittently applying energy to the vehicles are within the purview of the invention. More than one loading and/or unloading station per route is possible with alternate vehicles being unloaded at each station. Only five vehicles are shown in the drawing, but it is to be understood that a large number of vehicles would be employed depending upon the length and cross-sectional diameter of the guideway, desired through-put capacity and application. Furthermore, several vehicles could be connected into a train.

What is claimed is:

1. A transportation system comprising:
   (a) a hollow tubular guideway of a predetermined cross-section configuration, said guideway being filled with air and defining a pathway adapted to convey a vehicle axially therethrough, said tubular guideway being free from external air pump means;
   (b) at least one loading station located in said guideway and at least one unloading station located in said guideway at a point remote from said loading station, said vehicles traveling in a direction from said loading station to said unloading station;
   (c) at least first and second vehicles disposed within said guideway, said vehicles being adapted to carry cargo, said vehicles being provided with anti-friction means for support and having a cross-section substantially coextensive with the cross-section of at least portions of said guideway;
   (d) drive means for said vehicles said drive means being external from said vehicles and disposed stationarily with respect to said tubeway, said drive means imparting kinetic energy to the first of said at least first and second vehicles to move it in a direction towards said unloading station, the second one of said at least first and second vehicles being located in front of said first vehicle, the downstream movement of said first vehicle causing a column of trapped air between said first and second vehicles to move downstream, the downstream movement of the trapped air column imparting energy to propel said second vehicle further downstream; additional drive means being located along portions of said pipeline as necessary to supply energy to said vehicles.

2. The transportation system of claim 1 wherein said drive means may decelerate said vehicles.

3. A transportation system of the type having a hollow tubular guideway adapted to convey a vehicle axially therethrough along a predetermined path; at least first and second vehicles within said guideway, said vehicles being provided with anti-friction means for support and having a cross-section substantially coextensive with at least portions of said guideway; and means for driving said vehicles; said transportation system, characterized in that:

said tubular guideway is free from external air pump means;

said drive means comprises an external drive means to periodically apply kinetic energy to said vehicles;

movement of a first one of said vehicles in response to said external drive means causes a column of air to compress in front of said first vehicle and to expand behind said first vehicle, thus setting up a pressure differential between the front and back of said first vehicle, which pressure differential applies additional propelling force to said first vehicle and to the others of said at least first and second vehicle which are located in front of said first vehicle in said guideway.

* * * * *